US012313232B2

(12) United States Patent
Leermakers et al.

(10) Patent No.: US 12,313,232 B2
(45) Date of Patent: May 27, 2025

(54) LIGHTING SYSTEM FOR EMITTING LIGHT COMPRISING TWO CONNECTABLE LIGHTING MODULES, A LIGHTING MODULE, A METHOD OF OPERATING A LIGHTING MODULE AS WELL AS A CORRESPONDING METHOD

(71) Applicant: SIGNIFY HOLDING B.V., Eindhoven (NL)

(72) Inventors: Remco Christianus Wilhelmus Leermakers, Tilburg (NL); Paul Joseph Maria Beerens, Weert (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/572,375

(22) PCT Filed: Jun. 14, 2022

(86) PCT No.: PCT/EP2022/066165
§ 371 (c)(1),
(2) Date: Dec. 20, 2023

(87) PCT Pub. No.: WO2023/274717
PCT Pub. Date: Jan. 5, 2023

(65) Prior Publication Data

US 2024/0369199 A1 Nov. 7, 2024

(30) Foreign Application Priority Data

Jun. 29, 2021 (EP) .................................... 21182283

(51) Int. Cl.
*F21S 2/00* (2016.01)
*F21V 21/005* (2006.01)
(Continued)

(52) U.S. Cl.
CPC ............ *F21S 2/005* (2013.01); *F21V 21/005* (2013.01); *F21V 23/045* (2013.01); *F21V 23/06* (2013.01);
(Continued)

(58) Field of Classification Search
CPC ........ F21S 2/005; H05B 47/19; F21V 21/005; F21V 23/045; F21V 23/06
(Continued)

(56) References Cited

U.S. PATENT DOCUMENTS

2013/0122724 A1 5/2013 Velazquez
2013/0200791 A1 8/2013 Van Herpen et al.
(Continued)

FOREIGN PATENT DOCUMENTS

RU 2702222 C2 10/2019
WO 2020043417 A1 3/2020

*Primary Examiner* — Bryon T Gyllstrom

(57) ABSTRACT

A lighting system for emitting light, the system comprising a first and a second lighting module as well as a plug for connecting the two lighting modules to each other, each lighting module comprises a housing, the housing having a first side and a second side, opposite to the first side, such that the second side of the first lighting module is connected to the first side of the second lighting module when the two lighting modules are connected via the plug, each housing comprises at least one Light Emitting Diode, LED, for emitting the light, a controller arranged for wirelessly communicating with the other one of the two lighting modules via a magnetic field antenna, the magnetic field antenna—wherein the first lighting module has the magnetic field antenna positioned in the housing close to, or adjacent, its second side and wherein the second lighting module has the magnetic field antenna positioned in the housing close to, or adjacent, its first side such that when the two lighting
(Continued)

modules are connected using the plug, the magnetic field antennas of the first and second module are aligned.

13 Claims, 5 Drawing Sheets

(51) Int. Cl.
*F21V 23/04* (2006.01)
*F21V 23/06* (2006.01)
*F21Y 103/10* (2016.01)
*F21Y 113/00* (2016.01)
*F21Y 115/10* (2016.01)
*H05B 47/19* (2020.01)

(52) U.S. Cl.
CPC .......... *H05B 47/19* (2020.01); *F21Y 2103/10* (2016.08); *F21Y 2113/00* (2013.01); *F21Y 2115/10* (2016.08)

(58) Field of Classification Search
USPC ..................................................... 362/249.02
See application file for complete search history.

(56) References Cited

U.S. PATENT DOCUMENTS

| | | | | |
|---|---|---|---|---|
| 2015/0338077 | A1* | 11/2015 | Johnson | F21V 23/0442 362/249.02 |
| 2017/0086281 | A1* | 3/2017 | Avrahamy | H05B 47/115 |
| 2018/0112837 | A1 | 4/2018 | Sadwick | |
| 2018/0124895 | A1* | 5/2018 | Alexander | H05B 47/175 |
| 2022/0045877 | A1 | 2/2022 | Beij et al. | |
| 2024/0004632 | A1* | 1/2024 | Renaud | H04B 5/70 |

* cited by examiner

LIGHTING SYSTEM FOR EMITTING LIGHT COMPRISING TWO CONNECTABLE LIGHTING MODULES, A LIGHTING MODULE, A METHOD OF OPERATING A LIGHTING MODULE AS WELL AS A CORRESPONDING METHOD

CROSS-REFERENCE TO PRIOR APPLICATIONS

This application is the U.S. National Phase application under 35 U.S.C. § 371 of International Application No. PCT/EP2022/066165, filed on Jun. 14, 2022, which claims the benefit of European Patent Application No. 21182283.8, filed on Jun. 29, 2021. These applications are hereby incorporated by reference herein.

TECHNICAL FIELD

The present disclosure generally relates to lighting and, more specifically, to a lighting system comprising two connectable lighting modules that are able to communicate with one another.

BACKGROUND

Lighting systems for emitting light already exist in the art. These kinds of systems may comprise a plurality of interconnected lighting modules, wherein each lighting module is arranged to emit light.

Often, the interconnection between the lighting modules is in the form of a Direct Current, DC, plug such that power from one lighting modules may be transferred to the next lighting module. This allows for an installation in which a single lighting module is powered from the mains, and wherein the power is passed through all the connected lighting modules via the corresponding DC plugs.

It is also known that the color temperature and the brightness of a lighting module may be changed for example by swiping a magnetic Radio Frequency, RF, card over the corresponding lighting module. The lighting module may thus comprises an RF reader, magnetic detector like a reed contact or a push button.

The lighting module may comprise an RF reader, i.e. one or more reed contacts, or the like for communicating with the RF card. Based on the location of the swipe over the lighting module, the number of swipes, the direction of the swipe, or anything alike, the color temperature and/or the brightness of the lighting module may be changed.

If the color temperature and/or the brightness of the lighting system need to be changed, it is currently required to swipe over each of the interconnected lighting modules of that lighting system. There are no means currently available for communicating the corresponding information from one lighting module to the next, connected, lighting module.

One of the drawbacks of the known lighting system is that it is required to set, or control, each of the lighting modules separately to the desired color temperature and/or brightness.

SUMMARY

It is an object of the present disclosure to provide for a lighting system, in which interconnected lighting modules are able to directly communicate to each other for, for example, communicate light settings like color temperature and/or brightness.

It is a further object of the present disclosure to provide for a corresponding lighting module, method and computer program product.

In a first aspect, there is provided a lighting system for emitting light, the system comprising a first and a second lighting module as well as a plug for connecting the two lighting modules to each other, each lighting module comprises:

- a housing, the housing having a first side and a second side, opposite to the first side, such that the second side of the first lighting module is connected to the first side of the second lighting module when the two lighting modules are connected via the plug;
- at least one Light Emitting Diode, LED, for emitting the light;
- a controller arranged for wirelessly communicating with the other one of the two lighting modules via a magnetic field antenna;
- the magnetic field antenna;
- wherein the first lighting module has the magnetic field antenna positioned in the housing close to, or adjacent to, its second side and wherein the second lighting module has the magnetic field antenna positioned in the housing close to, or adjacent, its first side such that when the two lighting modules are connected using the plug, the magnetic field antennas of the first and second module are aligned such that the magnetic field antenna of the first module is able to communicate with the magnetic field antenna of the second module.

The inventors have found that it is advantageous when the first lighting module and the second lighting module are able to communicate with each other using magnetic field antennas. The magnetic field antenna of the first lighting module is positioned in its housing close to, or adjacent, its second side and the magnetic field antenna of the second lighting module is positioned in its housing close to, or adjacent, its first side such that when the two lighting modules are connected using the plug, the magnetic field antennas of the first and second module are aligned.

That is, when the first and second lighting module are connected, the magnetic fields originating from a magnetic field antenna are able to be sensed by the other magnetic field antenna. This alignment allows the magnetic field antenna of the first lighting module to communicate with the magnetic field antenna of the second lighting module.

The above-described communication allows for data to be communicated from the first lighting module to the second lighting module, and vice versa. Whenever, for example, the color temperature and/or brightness of the first lighting module is changed, those settings may be communicated via the magnetic loop antenna to the second lighting module for ensuring that those changes are also implemented in the second lighting module.

The housing may, for example, have an elongated shape, wherein the first and second lighting module are connected, and aligned, to each other in the elongated direction. As such, the magnetic field antennas may be placed at the end faces of the elongated housing to ensure that the distance between those magnetic field antennas is small enough such that the magnetic field antennas are in wireless, magnetic, contact with each other.

Further, the housing may be made of a plastic material, for example polypropylene or polyethylene to ensure that the magnetic fields produced by a magnetic field antenna are not blocked. The housing may also be made of metal. In that case, the first side and the second side of the lighting modules may comprise a slot, or an opening or the like for ensuring that the magnetic fields produced by a corresponding magnetic field antenna are able to escape the housing.

It is noted that, when the first lighting module is connected to the second lighting module, the distance between the second side of the first lighting module and the first side of the second lighting module is less than 30 mm, preferably less than 20 mm, for ensuring a reliable wireless connection between the corresponding magnetic field antennas.

One of the advantages of the above-described solution is that it is not required to add communication wires to the plug for ensuring communication between the first and second lighting module. Adding communication wires to the plug is, often, not desired as that would require an undesired update of the plug.

In an example, the plug is arranged to align the two lighting modules such that the two magnetic field antennas are aligned with each other.

The plug may, for example, penetrate into the first and second lighting modules. Receiving sections may be provided at the first and second lighting module for receiving the plug. These receiving sections may be provided such that the receiving sections of the two lighting modules are aligned to each other. By connecting the lighting modules via their respective receiving sections, using the plug, the lighting modules are automatically aligned as well. This knowledge is used by the examiner to ensure that the magnetic field antennas are aligned.

In a further example, a length of the plug is smaller than 30 mm, preferably smaller than 20 mm.

The inventors have found that it might be beneficial if the plug is not too long to ensure that the distance between the magnetic field antennas is within wireless communication distance. As such, preferably, the distance is smaller than 40 mm.

In another example, the plug is a two-pole power connector for transferring electrical power from the first lighting module to the second lighting module for powering the second lighting module.

The advantage of this particular example is that only one lighting module may be powered, for example by a Direct Current, DC, or an Alternating Current, AC, power source, and that the electrical power is passed through each of the connected lighting modules via the plug.

The above allows multiple lighting systems to be connected to each other using a single power source. A single 24 Volt DC power source may, for example, be able to power up to six, seven or eight interconnected lighting modules. There might be a limitation in the number of interconnected power sources due to losses in the transport of the electrical power. An AC power source may, for example, power even more interconnected lighting modules as the electrical losses are smaller compared to a DC power source.

The plug may thus be a two-pole power connector. The inventors have realized that it might not be advantageous to use the two-power power connector for wireless communicating data as well, i.e. by superimposing any data communication on top of the power. This would require in large power components for transmitting and receiving the data and would require a very stable filtered power supply.

In a further example, the magnetic field antennas comprised by the first and second lighting modules comprise a magnetic loop antenna.

A magnetic loop antenna may behave electrically as a coil, i.e. an inductor. It couples to the magnetic field of a radio wave in the region near the antenna. The magnetic loop antennas are positioned close to each other, when the lighting modules are connected to each other, such that the communication between the lighting modules take place in the near field. The magnetic loop antenna may thus be used for near field communication. The "near field" is a region in which there are strong inductive and capacitive effects from the currents and charges in the antenna that cause electromagnetic, especially magnetic, components that do not behave like far-field radiation. These effects decrease in power far more quickly with distance than the far-field radiation effects.

In another example, each housing comprises two transmit antennas and two receive antennas, wherein a first combination of a transmit antenna and a receive antenna is provided close to, or adjacent, its first side of the housing and wherein a second combination of a transmit antenna and a receive antenna is provided close to, or adjacent, its second side of the housing.

The inventors have found that it might be beneficial if for each side of the housing two antennas are provided, one for transmitting data and one for receiving data. This has multiple advantages. One of the advantages is that a lighting module is able to transmit and receive data simultaneously. Another advantage is related to the design of the lighting module. The receive antenna may be construed differently to a transmit antenna. By differentiating in these antennas, each of the transmit antenna and the receive antenna may be optimized for its particular function.

In a further example, the controller is arranged to forward a communication received via a receive antenna provided close to, or adjacent to, the first side using the transmit antenna provided close to, or adjacent to, the second side.

The advantage of this particular example is that it prevents data to echo in the lighting system. A lighting system may be arranged to forward a communication received from an antenna provided at a first side, using the antenna provided at the second side only. This prevents the communication to circulate back to the originating lighting module and thereby prevents echoing.

The controller may thus determine which of the antennas has received a particular communication and may use the other antenna for forwarding the received communication.

In yet another example, the lighting system further comprises a magnetic card for setting a characteristic of the light emitted by the lighting system, wherein:

- the controller of the first lighting module is arranged for receiving, via a magnetic field, the characteristic of the light and for wirelessly communicating the characteristic with the second lighting module via its corresponding magnetic field antenna.

The lighting module may, for example, comprise two reed contacts that can be activated or controlled using a magnetic card for setting a characteristic of the light emitted by that particular lighting module. Such a magnetic card may, for example, be a Near Field Communication, NFC enabled card. The controller may then be arranged to forward the received setting of the characteristics of the light to its neighbors, i.e. to the lighting module directly connected thereto.

The above allows the setting of the characteristics to be communicated to all the interconnected lighting modules in the lighting system.

The above identified characteristic may, for example, be any of color and brightness.

It is noted that the lighting module may comprise at least one LED for emitting light. The lighting system may comprise a plurality of LEDs in different color temperatures, for example White LEDs, red LEDs, green LEDs and blue LEDs. By differentiating in the intensity of each of the LEDs a particular color may be emitted. The overall intensity of the LEDs may determine the brightness of the corresponding lighting module.

It is also noted that the communication between the lighting modules may be utilized for visual light communication, VLC.

That is, each of the lighting modules in the lighting system may be used for communication, using light, with a VLC enabled device. The lighting modules may be synchronized in that they transmit, or receive, data with the VLC enabled device. This allows for increased coverage and more reliable communication between the VLC enabled device and the lighting system.

In an example, the plug is an elongated, rigid, connector for connecting the two lighting modules.

The plug may accomplish different functionalities. One of the functionalities is directed to aligning the first lighting module with the second lighting module for ensuring that the magnetic field antennas are aligned with each other. Another functionality is that the plug may ensure power transfer from the first lighting module to the second lighting module, or vice versa. A rigid connector improves the aligning aspect of the present disclosure.

In a further example, the controller of the first lighting module is further arranged for detecting that said second lighting module is connected to said first lighting module, and wherein the controller of the first lighting module is arranged for wirelessly communicating with the second lighting module upon said detection.

The advantage of this particular example is related to efficiency. The inventors have found that a particular antenna does not need to be used when there is no further lighting module connected to that corresponding side of the lighting module. As such, the controller is arranged for using a particular antenna only when it has been detected that a particular lighting module is connected at that particular side.

Such a detection may be implemented in several ways. One of the possibilities is to implement the detection in a mechanical manner. Inserting the plug in the lighting module may cause a switch to flip, thereby indicating that a lighting module is connected. Another option is that wireless controller periodically sends out beacons to determine whether a lighting module is connected.

In another example, the magnetic field antenna is provided on a Printed Circuit Board that is mounted to the housing.

The inventors have realized that the magnetic field antenna may be provided on a PCB. That is, the PCB traces may be formed in one or more loops that form the magnetic field antenna.

The housing may have an elongated shape, and the PCB may be mounted to the housing in the elongated direction. In order to assure that the loop of the magnetic field antenna faces correctly, i.e. toward the interconnected next lighting module, a 90 degree mounting may be preferred. A flex PCB may be used for this purpose or an L-shaped connected for assuring that the PCB is rotated 90 degrees.

In another example, wherein the housing comprises an elongated part as well as two end caps for closing the elongated part, and wherein the magnetic field antenna is provided in one of the two end caps.

The magnetic field antennas may be provided in the end caps of the housing in order to reduce the distance between two adjacent magnetic field antennas, and thus thereby improve the reliability of the communication between lighting modules.

The end caps may be clicked, or screwed, on the elongated part for closing the housing all together. An electrical connection between the magnetic field antenna in the end cap and the controller may be established by connecting the end cap on the elongated part to realize a mechanical connection.

In a second aspect, there is provided a first lighting module arranged for operating in a lighting system in accordance with any of the previous examples.

The advantages as explained with respect to the first aspect, being the lighting system, are also applicable to the examples with respect to the second aspect, being the first lighting module.

In a third aspect, there is provided a method of operating a first lighting module in accordance with the previous aspect, wherein said method comprises the step of:

wirelessly communicating, by said controller, with the second lighting module via the corresponding magnetic field antenna.

In an example, the method further comprises the step of:

detecting, by said controller, that said second lighting module is connected to the first lighting module, and wherein said step of wirelessly communicating is triggered by said detection.

In a fourth aspect, there is provided a computer program product comprising computer readable instructions which, when executed by a first lighting module, cause said first lighting module to implement a method in accordance with any of the examples as provided above.

These and other aspects of the invention will be apparent from and elucidated with reference to the embodiment(s) described hereinafter.

DETAILED DESCRIPTION

Figure 1:
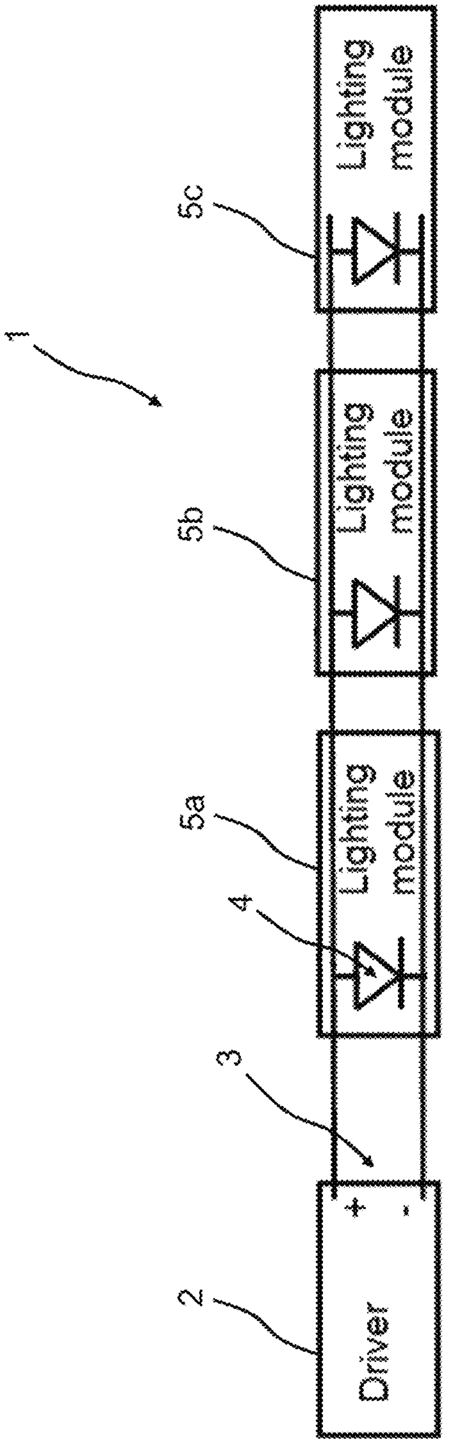
FIG. 1 discloses a schematic drawing of a lighting system in accordance with the prior art.

FIG. 1 discloses a schematic drawing 1 of a lighting system in accordance with the prior art.

The lighting system 1 comprises a driver 2 as well as three lighting modules as indicated with reference numerals **5*a*, 5*b* and 5*c*. Each lighting module 5*a*, 5*b*, 5*c* comprises one or more Light Emitting Diodes, LEDs, 4** for emitting light. The lighting modules may comprise white LEDs and/or RGB LEDs for emitting any desired color.

The driver 2 is arranged to provide the electrical power to all of the lighting modules **5*a*, 5*b*, 5*c* via power connection 3. The power is passed through by a lighting module 5*a* to the next lighting module 5*b*, and so on. This ensures that all lighting modules 5*a*, 5*b*, 5*c*** are powered.

Figure 2:
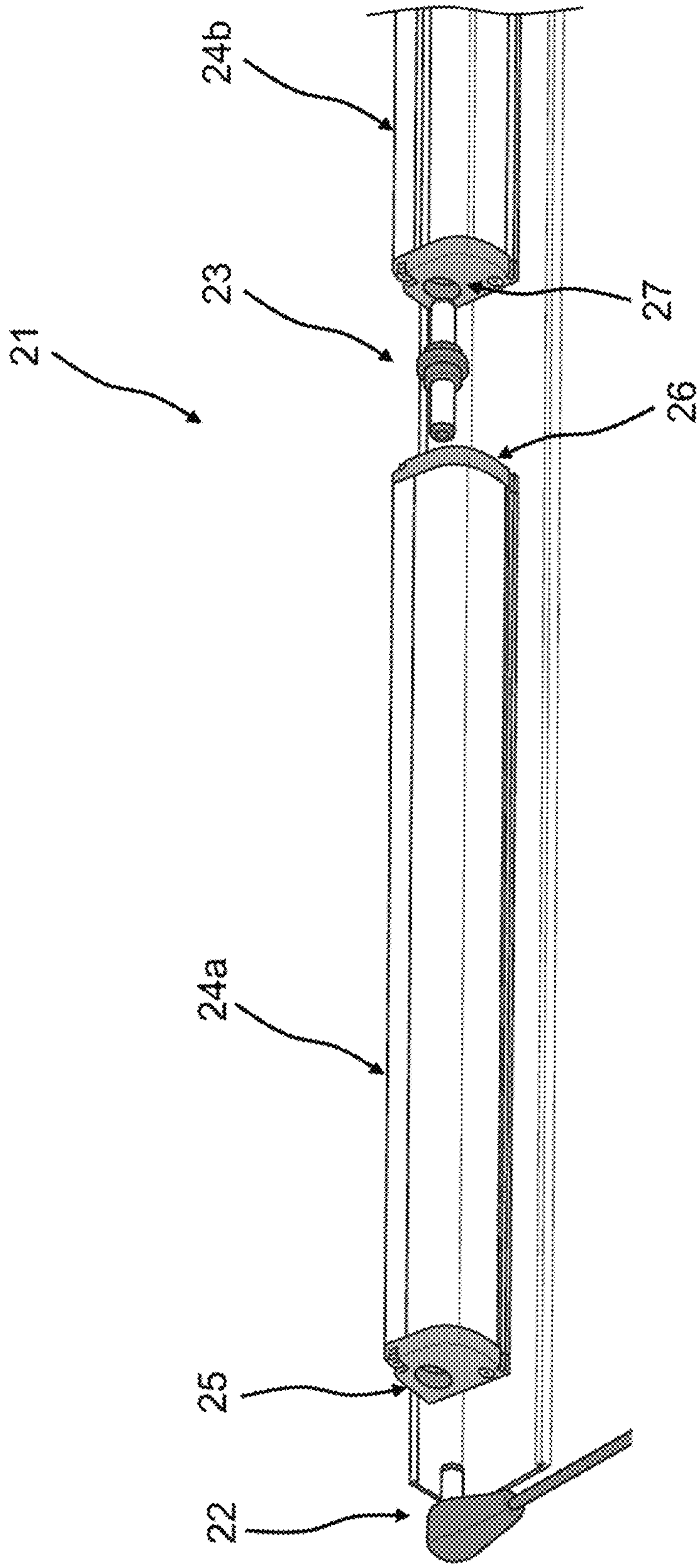
FIG. 2 discloses an illustrative drawing of a lighting system in accordance with the present disclosure.

FIG. 2 discloses an illustrative drawing of a lighting system 21 in accordance with the present disclosure.

The lighting system 21 is arranged for emitting light, wherein the system 21 comprises a first lighting module **24*a*, a second lighting module 24***b* as well as a plug 23 for connecting the two lighting modules 24*a*, 24*b* to each other.

Each lighting module comprises a housing to prevent a user from reaching the inside of the housing. The housing may be provided with a translucent material to ensure that light is emitted from the lighting module. The housing may be equipped with electronics like the LEDs, power converters, a controller, etc.

Each housing has a first side 25, 27 and a second side 26 that is opposite to the first side 25, 27. As such, the second side 26 of a first lighting module 24*a* is connected to the first face 27 of the second lighting module 24*b* using the plug 23.

The housing thus comprises at least one LED for emitting light, a controller arranged for wirelessly communicating with the other one of the two lighting modules via a magnetic field antenna as well as the magnetic field antenna itself. This is explained in more detail with respect to FIGS. 3-6.

The magnetic field antennas are oriented such that the first lighting module 24*a* has the magnetic field antenna positioned in the housing close to, or adjacent, its second side 26 and the second lighting module 24*b* has the magnetic field antenna positioned in the housing close to, or adjacent, its first side 27 such that when the two lighting modules 24*a*, 24*b* are connected using the plug 23, the magnetic field antennas of the first and second module are aligned.

Figure 3:
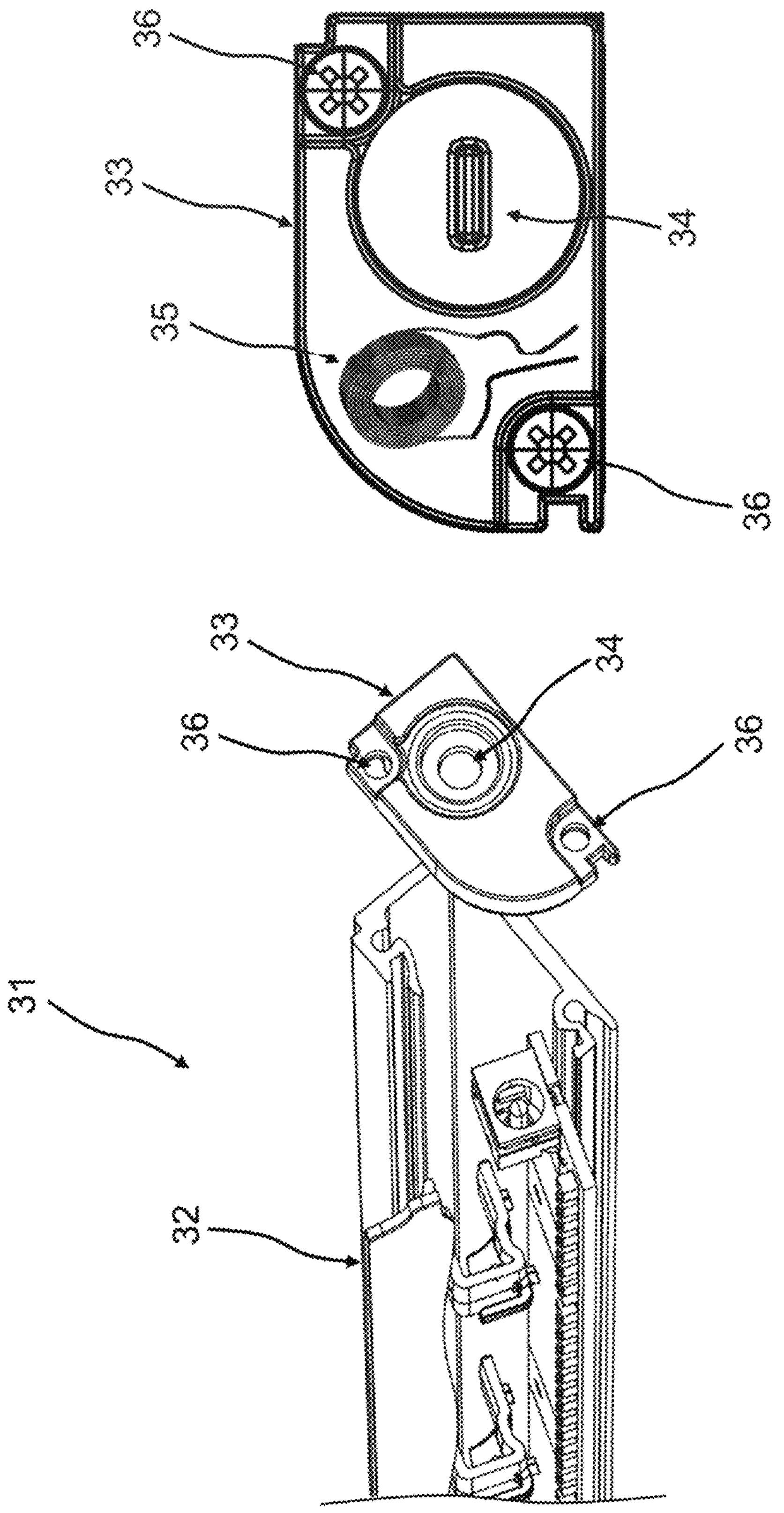
FIG. 3 discloses an example of a lighting module used in a lighting system in accordance with the present disclosure.

FIG. 3 discloses an example of a lighting module 31 used in a lighting system in accordance with the present disclosure.

The housing of the lighting module 31 is indicated with reference numerals 32 and 33. The housing 32 is elongated. The housing 32 is closed by the end cap as indicated with reference numeral 33. The end cap 33 is mounted to the elongated part 32 via the mounting holes 36.

On the right-hand side of FIG. 3, the end cap 33 is shown in more detail. The mounting holes are again indicated with reference numeral 36. A receiving section 34 is provided that is arranged for receiving the plug for connecting the lighting module to a next lighting module.

As shown in FIG. 3, the magnetic field antenna 35 may be mounted at the end cap 33, for example integrated in the end cap 33. An electrical connection between the magnetic field antenna 35 and the controller may be provided by screws that are to be used for mounting the end cap 33 to the elongated part 32. The screws may make an electrical connection with the magnetic field antenna 35 as well as with a controller, for example via an electrical connection wire/track or the like.

The magnetic field antenna 35 may be provided in the form of an inductor, as shown in FIG. 3. Another option is that a PCB is provided in the end cap 33, and that tracks on the PCB form the magnetic field antenna. The tracks may, for example, be provided in a loop for generating the magnetic field.

Figure 4:
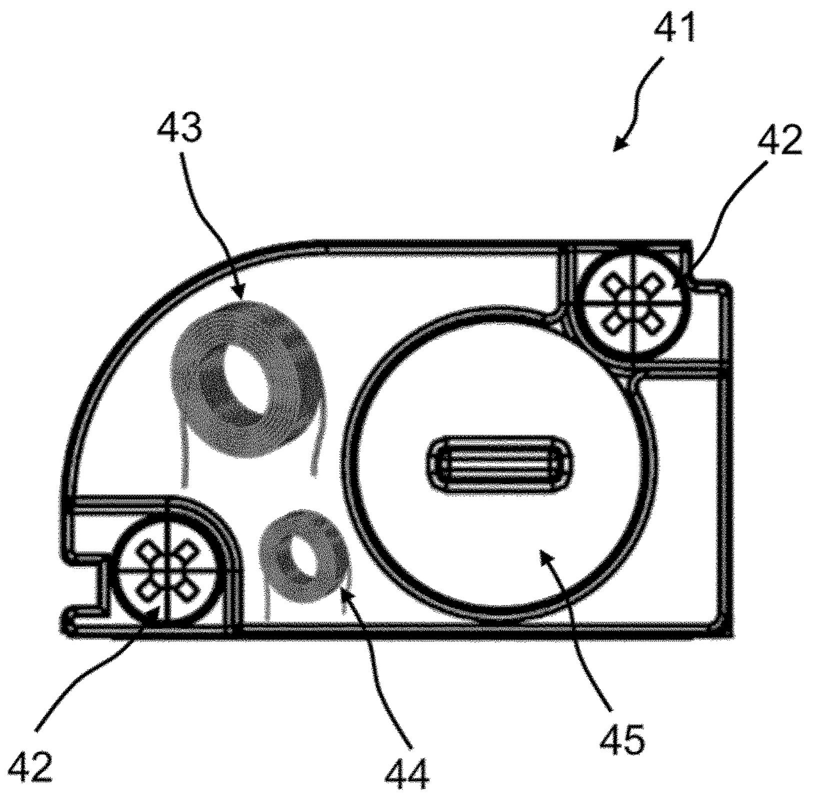
FIG. 4 discloses an end cap comprised by a housing of a lighting module in accordance with the present disclosure.

FIG. 4 discloses an end cap 41 comprised by a housing of a lighting module in accordance with the present disclosure.

This particular example shows an end cap 41 having two mounting holes 42 for mounting the end cap to the elongated part of the housing. Again, a receiving section 45 is provided for receiving a plug for connecting the lighting module to the next lighting module.

Here, two antennas are provided in the end cap 41 as indicated with reference numerals 43 and 44. One antenna may be used for transmitting data and the other antenna may be used for receiving data.

Figure 5:
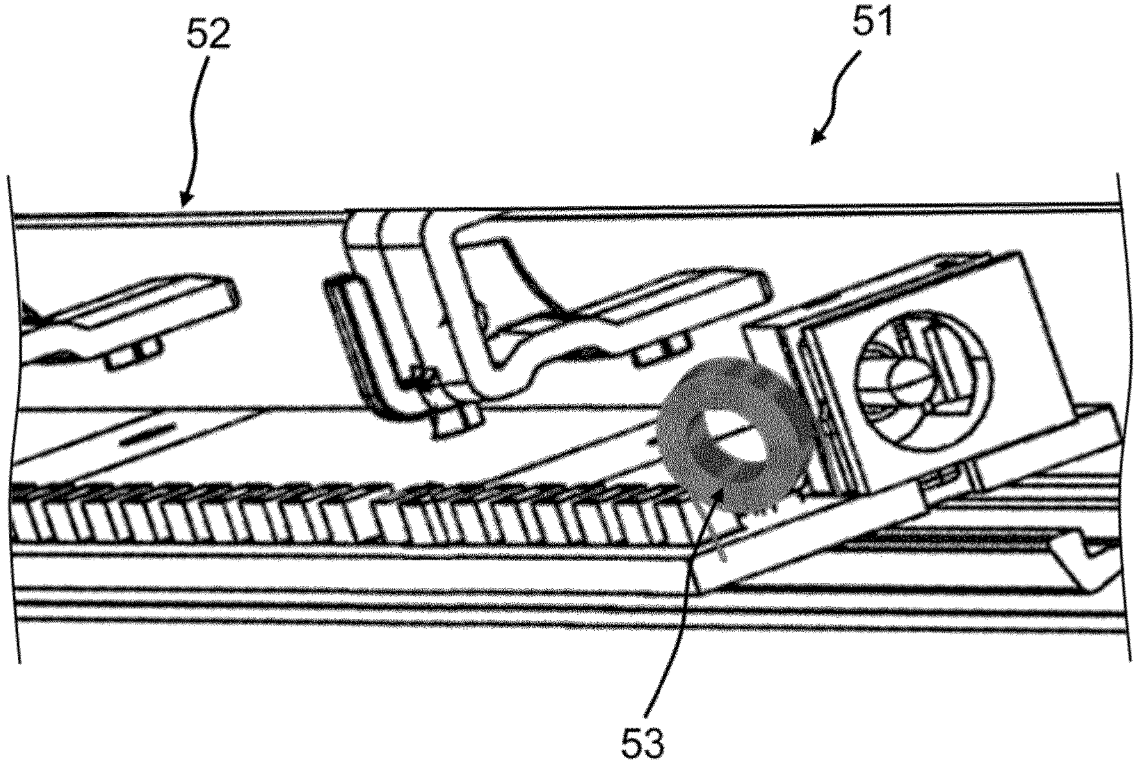
FIG. 5 discloses a housing of a lighting module in accordance with the present disclosure.

FIG. 5 discloses a housing of a lighting module 51 in accordance with the present disclosure.

The housing is indicated with reference numeral 52. The magnetic field antenna is indicated with reference numeral 53 and is embodied in the elongated part of the housing, not in the end cap.

The magnetic field antenna may, for example, be provided on a PCB, or may be provided as a separate component. In any case, it may be desirable to assure that the loop faces the loop of the magnetic field antenna comprised by the lighting module connected to the present lighting module.

Figure 6:
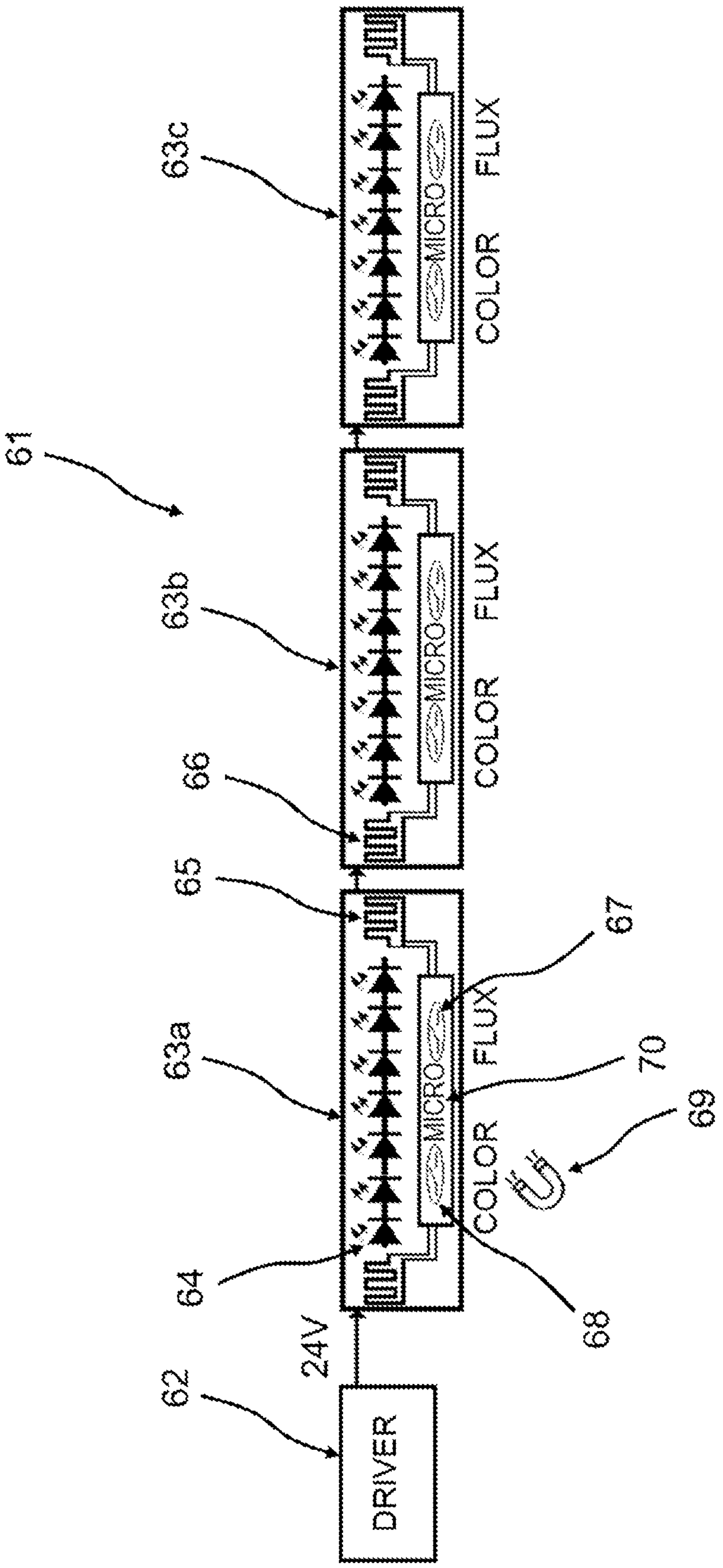
FIG. 6 discloses a lighting system in accordance with the present disclosure.

FIG. 6 discloses a lighting system 61 in accordance with the present disclosure.

In this particular example, the lighting system 61 comprises three interconnected lighting modules as indicated with reference numerals 63*a*, 63*b* and 63*c*.

The first lighting module 63 comprises a string of LEDs 64 for emitting light. Further a controller 70 is provided for wirelessly communicating with the next lighting module 63*b* via a magnetic field antenna 65.

The controller may be a microcontroller, a Field Programmable Gate Array, FPGA, and Application Specific Integrated Circuit, ASIC, a processor or anything alike. The controller may be fed by the same driver 62 that also feeds the lighting modules 63*a*, 63*b* and 63*c*.

The controller is electrically connected with the corresponding magnetic field antennas, for example the one indicated with reference numeral 65. As explained above, the magnetic field antennas 65 may be mounted to an end cap of the housing or inside the elongated housing itself.

The lighting system 61 of FIG. 6 comprises a magnetic card 69 for setting a particular characteristic of the light that is emitted by the lighting system. The magnetic card 69 may be swept over a color reed contact 68 for changing the color of the lighting system 61 and/or may be swept over a reed contact 67 for changing the brightness of the lighting system 61.

The controller 70 may thus detect the above-mentioned swipes of the card, and may translate this to a particular characteristic that is subsequently communicated to the next lighting module 63*b* via the magnetic field antenna 65.

The controller 70 of the first lighting module 63*a* is thus arranged for receiving, via a magnetic field from the magnetic card, the characteristic of the light and for wirelessly communicating the characteristic with the second lighting module 63*b* via its corresponding magnetic field antenna.

It is noted that in this particular example, the driver 62 provides a Direct Current, DC, voltage supply of 24 Vdc to the first lighting module 63*a* and that the first lighting module 63 provides that 24 Vdc to the next lighting module 63 and so on. The advantage of 24V is that it is an SELV voltages which may be double isolated from mains, such that each person can and is allowed to plug in the modules. The driver 62 may, alternatively, also provide for an Alternating Current, AC, voltage supply to the first lighting module 63*a*. In that case, the lighting module 63 may comprise a buck converter or the like for converting the AC supply to a DC supply for powering the LEDs and the controller.

As mentioned above, the lighting modules 63*a*, 63*b* and 63*c* are connected to each other using plugs (not shown in this figure) for aligning the lighting modules with respect to each other. The plugs are also arranged for ensuring power transfer between two connected lighting modules.

Other variations to the disclosed embodiments can be understood and effected by those skilled in the art in practicing the claimed invention, from a study of the drawings, the disclosure, and the appended claims. In the claims, the word “Comprising” does not exclude other elements or steps, and the indefinite article “a” or “an” does not exclude a plurality. A single processor or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope thereof.

The invention claimed is:

1. A lighting system for emitting light, the system comprising a first and a second lighting module as well as a plug for connecting the two lighting modules to each other, each lighting module comprises:

a housing, the housing having a first side and a second side, opposite to the first side, such that the second side of the first lighting module is connected to the first side of the second lighting module when the two lighting modules are connected via the plug;

at least one Light Emitting Diode, LED, for emitting the light;

a controller arranged for wirelessly communicating with the other one of the two lighting modules via a magnetic field antenna;

the magnetic field antenna;

wherein the first lighting module has the magnetic field antenna positioned in the housing close to, or adjacent to, its second side and wherein the second lighting module has the magnetic field antenna positioned in the housing close to, or adjacent to, its first side such that when the two lighting modules are connected using the plug, the magnetic field antennas of the first and second module are aligned such that the magnetic field antenna of the first lighting module is able to communicate with the magnetic field antenna of the second lighting module.

2. A lighting system in accordance with claim 1, wherein the plug is arranged to align the two lighting modules such that the two magnetic field antennas are aligned with each other.

3. A lighting system in accordance with claim 2, wherein a length of the plug is smaller than 30 mm.

4. A lighting system in accordance with claim 1, wherein the plug is a two-pole power connector for transferring electrical power from the first lighting module to the second lighting module for powering the second lighting module.

5. A lighting system in accordance with claim 1, wherein the magnetic field antennas comprised by the first and second lighting modules comprise a magnetic loop antenna.

6. A lighting system in accordance with claim 1, wherein each housing comprises two transmit antennas and two receive antennas, wherein a first combination of a transmit antenna and a receive antenna is provided close to, or adjacent, its first side of the housing and wherein a second combination of a transmit antenna and a receive antenna is provided close to, or adjacent, its second side of the housing.

7. A lighting system in accordance with claim 6, wherein:

the controller is arranged to forward a communication received via a receive antenna provided close to, or adjacent, the first side using the transmit antenna provided close to, or adjacent, the second side.

8. A lighting system in accordance with claim 1, wherein the lighting system further comprises a magnetic card for setting a characteristic of the light emitted by the lighting system, wherein:

the controller of the first lighting module is arranged for receiving, via a magnetic field from the magnetic card, the characteristic of the light and for wirelessly communicating the characteristic with the second lighting module via its corresponding magnetic field antenna.

9. A lighting system in accordance with claim 8, wherein the characteristic is any of color and brightness.

10. A lighting system in accordance with claim 1, wherein the plug is an elongated, rigid, connector for connecting the two lighting modules.

11. A lighting system in accordance with claim 1, wherein the controller of the first lighting module is further arranged for detecting that said second lighting module is connected to said first lighting module, and wherein the controller of the first lighting module is arranged for wirelessly communicating with the second lighting module upon said detection.

12. A lighting system in accordance with claim 1, wherein the magnetic field antenna is provided on a Printed Circuit Board that is mounted to the housing.

13. A lighting system in accordance with claim 1, wherein the housing comprises an elongated part as well as two end caps for closing the elongated part, and wherein the magnetic field antenna is provided in one of the two end caps.

* * * * *